United States Patent [19]

Mattingly

[11] Patent Number: 5,186,747
[45] Date of Patent: Feb. 16, 1993

[54] ORGANOPHILIC CLAYS PREACTIVATED WITH PROPYLENE CARBONATE

[75] Inventor: Wayne T. Mattingly, Louisville, Ky.

[73] Assignee: United Catalysts Inc., Louisville, Ky.

[21] Appl. No.: 676,558

[22] Filed: Mar. 28, 1991

[51] Int. Cl.$^5$ ............... C09C 1/02; C10M 125/30; C10M 125/26/113/10
[52] U.S. Cl. ................... 106/468; 252/28; 252/30; 252/363.5
[58] Field of Search ............ 106/468; 252/28, 30, 252/363.5, 315.6, 320, 325

[56] References Cited

U.S. PATENT DOCUMENTS

| | | | |
|---|---|---|---|
| 2,939,840 | 6/1960 | Tronczak | 252/28 |
| 3,579,448 | 5/1971 | Harrison | 252/28 |
| 4,298,481 | 11/1981 | Clarke | 252/565 |
| 4,664,820 | 5/1987 | Magauran et al. | 252/28 |

*Primary Examiner*—Mark L. Bell
*Assistant Examiner*—C. M. Bonner
*Attorney, Agent, or Firm*—Herbert P. Price

[57] ABSTRACT

Preactivated organophilic clays useful as rheological control and gelling agents for organic liquids are made by dry blending the organophilic clays with free-flowing dry powder blends of 1,2-propylene carbonate and finely divided amorphous silica.

9 Claims, No Drawings

ORGANOPHILIC CLAYS PREACTIVATED WITH PROPYLENE CARBONATE

BACKGROUND OF THE INVENTION

The field of art to which this invention pertains is organophilic clays and preactivators therefor.

Organic compounds which contain a cation can react by ion exchange with clays having platelets in a negative layer-lattice and having exchangeable cations. If the organic cation contains at least one alkyl group having at least 10 carbon atoms, the resulting modified clay has the property of swelling in certain organic liquids so as to modify the rheological properties of the liquid. Organophilic clays have been described in a large number of patents, one of the earliest being U.S. Pat. No. 2,531,427.

In order to achieve the desired rheological properties of thickening and/or gelling the organic liquid, e.g., the formation of lubricating greases from liquid hydrocarbons, it is necessary that the organophilic clay be thoroughly dispersed in the liquid.

One method of obtaining proper dispersion and activation of the organic organophilic clay is to use polar activators, dispersants, dispersion aids, solvating agents, and the like as disclosed in U.S. Pat. No. 4,664,820 as well as U.S. Pat. Nos. 2,677,661; 2,704,276; 2,833,720; 2,879,229; 2,966,506; and 3,294,683. Examples of such compounds are acetone, methanol/water, ethanol/water, propylene carbonate, acetonylacetone, diacetone alcohol, dimethyl formamide, and gamma-butyl lactone. Such compounds are liquid and are added along with the organophilic clay to the organic liquid.

Another method for obtaining readily dispersible organophilic clays is to preactivate the clay by blending it with an additive. The use of finely divided solid alcohols, such as neopentyl glycol, 2-methyl-2-propanol, erythritol, monopalmitate glycol, and the like, is disclosed in U.S. Pat. No.4,435,218.

In U.S. Pat. No. 4,664,820, the use of such compounds as phthalide, 3-hydroxy-4-methoxy benzaldehyde, 4-benzyloxypropiophenone, triethyl citrate, 2-phenoxy-ethanol, 1-phenyl-1,2-ethanediol, nitrobenzyl alcohol, 1,6-hexanediol, castor oil, and nitrophenethyl alcohol are disclosed as preactivators for organophilic clays.

Other patents which disclose preactivators for organophilic clays are U.S. Pat. 3,937,678 and U.S. Pat. No. 3,977,894. The preactivators described in these patents are amide waxes and a mixture of an amide wax and glyceryl tri-12-hydroxystearate.

Organophilic clays having enhanced dispersibility have been made by subjecting the clay before or during the reaction with the organic cation to shear conditions which deagglomerate the clay particles. Patents which disclose these physical treatments are U.S. Pat. No. 3,951,850; 4,623,398; 4,695,402; 4,664,842; 4,743,305; and 4,664,820.

In U.S. Pat. No. 4,743,306, a mixture of clay and finely divided silica is reacted with an organic cation to form organophilic clays having improved dispersibility.

As disclosed in U.S. Pat. No. 4,382,868, organophilic c of improved dispersibility are prepared by extruding a mixture of clay, organic cation, water and alcohol, and thereafter grinding the extrudate without drying the water and alcohol.

Although polar activators, which are added along with the organophilic clay to the organic liquid, are efficient dispersion aids for the organophilic clay, the preactivators are preferred in industrial applications. The use of preactivated clays by the manufacturer eliminates the additional step of having to add the polar activator, eliminates a source of measurement error, and reduces the amount of hazardous chemicals to be handled.

Preactivators for organophilic clays are generally dry, waxy solids which are dry blended with the organophilic clay. Liquids are generally not used as organophilic clay preactivators because they cannot be readily dispersed uniformly throughout the clay and because clays treated with such liquids are not free-flowing and are difficult to handle.

SUMMARY OF THE INVENTION

This invention pertains to readily dispersible organophilic clays. In one aspect, this invention pertains to the modifier, the use of which enhances the dispersibility of the organophilic clay. In another aspect, this invention relates to the blend of the organophilic clay and modifier.

The composition of this invention which is used to enhance the dispersibility of organophilic clays is a free-flowing, dry powder blend of about 10 to about 75 weight percent 1,2-propylene carbonate and about 25 to about 90 weight percent finely divided amorphous silica, wherein said weight percents are based on the weight of the propylene carbonate and silica.

The organophilic clay composition of this invention is a dry blend of a) about 75 to about 99 weight percent of an organophilic clay wherein said clay is the reaction product of a smectite type clay having an ion exchange capacity of at least about 75 milliequivalents per 100 grams of clay and a quaternary ammonium compound having at least one alkyl substituent containing at least 10 carbon atoms, and b) about 1 to about 25 weight percent of a free-flowing dry powder made from a blend of 1,2-propylene carbonate and finely divided amorphous silica, wherein said weight percents are based on the weights of a) and b).

The organophilic clays of this invention are particularly useful as rheology control agents for printing inks and in the manufacture of lubricating greases.

DESCRIPTION OF THE INVENTION 1,2-Propylene carbonate (4-methyl-1,3-dioxolane-2-one) is a liquid at room temperature having a melting point of $-49.2°$ C. and a boiling point of $241.7°$ C.

The finely divided amorphous silica used in this invention is a finely divided silica which has an ultimate particle size of about 20 to about 50 millimicrometers and forms agglomerated particles of about 1 to about 100 micrometers. Precipitated silicas have surface areas of about 100 to about 1000 $m^2/g$ and have the ability to absorb up to at least 3 times their weight of liquid.

The amorphous silicas used in this invention are generally referred to as precipitated silica and fumed silica Precipitated silicas can be prepared by direct precipitation from silica sols or sodium silicate solutions neutralized in the presence of salts or miscible hydrogen-bonding solvents. They can also be prepared by precipitating a fine calcium silicate and then replacing the calcium by treatment with an acid. Finely divided silica can also be obtained from treatment of kaolin clay.

Fumed silica can be prepared by several processes. In one process, crystalline silica, such as sand, is fed directly to a high-temperature plasma jet. In another process, the flame hydrolysis process, silicon tetrachloride is reacted with hydrogen and oxygen in a flame to form the very fine silica plus hydrochloric acid. In another process, the high temperature arc process, silica is used as part of the electrodes. The silica is vaporized and recondensed as a fine silica dust.

The organophilic clays used in this invention are the reaction products of smectite-type clays and organic cations, i.e., quaternary ammonium compounds. The smectite-type clays are those which have a cation exchange capacity of at least about 75 milliequivalents per 100 grams of clay. Particularly desirable types of clays are the naturally occurring Wyoming varieties of swelling bentonites and like clays, and hectorite a swelling magnesium lithium silicate clay.

The clays, especially the bentonite type clays, are preferably converted to the sodium form if they are not already in this form. This can be done by preparing an aqueous clay slurry and passing the slurry through a bed of cation exchange resin in the sodium form. Alternatively, the clay can be mixed with water and a soluble sodium compound, such as sodium carbonate, sodium hydroxide and the like, followed by shearing the mixture with a pug mill or extruder The quaternary ammonium compounds used in this invention contain at least one alkyl substituent on the nitrogen atom having at least 10 carbon atoms and up to about 22 carbon atoms. The other nitrogen substituents are (a) linear or branched alkyl groups having 1 to about 22 carbon atoms, (b) arylalkyl groups, such as benzyl and substituted benzyl and (c) aryl groups, such as phenyl and substituted phenyl. The quaternary ammonium compounds can be represented by the structural formula

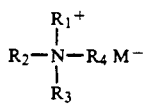

wherein M is an anion, such as chloride, bromide, iodide, nitrite, nitrate, sulfate, hydroxide, $C_1$ to $C_{18}$ carboxylate and the like, wherein $R_1$ is an alkyl group containing about 10 to about 22 carbon atoms, and $R_2$, $R_3$ and $R_4$ are alkyl groups containing 1 to about 22 carbon atoms, arylalkyl groups containing 7 to 22 carbon atoms, aryl groups containing 6 to 22 carbon atoms and mixtures thereof. Preferred quaternary ammonium compounds are those wherein $R_1$ and $R_2$ are alkyl groups having about 12 to about 22 carbon atoms and $R_3$ and $R_4$ are methyl, those wherein $R_1$ is an alkyl groups having about 12 to about 22 carbon atoms, $R_2$ is benzyl, and $R_3$ and $R_4$ are methyl, or mixtures thereof.

The long chain alkyl groups can be derived from naturally occurring vegetable oils, animal oils and fats or petrochemicals. Examples including corn oil, cotton seed oil, coconut oil, soybean oil, castor oil, tallow oil and alpha olefins. A particularly useful long chain alkyl group is derived from hydrogenated tallow.

Other alkyl groups which can be present in the quaternary ammonium compound are. such groups as methyl, ethyl, propyl, butyl, hexyl, 2-ethylhexyl, decyl, dodecyl, lauryl, stearyl and the like.

Aryl groups include phenyl and substituted phenyl Arylalkyl groups include benzyl and substituted benzyl groups.

Example of useful quaternary ammonium compounds are dimethyl di(hydrogenated tallow) ammonium chloride, methyl tri(hydrogenated tallow) ammonium chloride, dimethyl benzyl hydrogenated tallow ammonium chloride, methyl benzyl di(hydrogenated tallow) ammonium chloride and the like Preferred quaternary ammonium compounds are dimethyl di(hydrogenated tallow) ammonium chloride, dimethyl benzyl hydrogenated tallow ammonium chloride and mixtures thereof wherein the mixtures can contain 99 to 1 meqs of one compound to 1 to 99 meqs of the other compound.

The propylene carbonate-silica composition of this invention is a free-flowing dry powder made by blending 1,2-propylene carbonate with synthetic amorphous silica in the weight percents, based on the total weight of carbonate and silica, of about 10 to about 75 weight percent 1,2-propylene carbonate and about 25 to about 90 weight percent precipitated silica. A preferred composition is one which contains about 25 to about 70 weight percent 1,2-propylene carbonate and about 30 to about 75 weight percent precipitated silica.

The propylene carbonate-silica compositions are made by blending the two components together in a suitable mixing device which allows the fine silica powder to become "fluidized". Suitable mixing can be obtained by rotary action, tumbling or direct aeration. Examples of suitable mixing devices are ribbon blenders, conical blenders and V-type blenders Regardless of the type of mixer used, the propylene carbonate is slowly added, preferably in atomized form, to the "fluidized" silica and mixing is continued until a dry, free flowing powder is obtained As stated hereinbefore, the propylene carbonate-silica blend is basically a blend of 1,2-propylene carbonate and finely divided amorphous silica. However, up to about 10 weight percent, preferably about 2 to about 6 weight percent, water can be incorporated with the propylene carbonate, said weight percent being based on the weight of propylene carbonate and water.

The organophilic clays used in this invention contain about 50 to about 150 meqs of the quaternary ammonium compound based on 100 grams of clay on a 100 percent active basis and, preferably, about 80 to about 130 meqs.

In preparing the organophilic clays, the smectite type clays are slurried in water at a concentration of about 1 to about 10 weight percent. The clay slurry is then filtered and/or centrifuged to remove impurities, such as sand particles. The cleaned slurry has a concentration in water of about 1.5 to about 5 weight percent and is heated to about 40° C. to about 95° C., preferably about 60° C. to about 75° C. The quaternary ammonium compound (preferably as an emulsion in water or alcohol,) is added. Agitation and heating are continued for about 15 minutes to about 2 hours to complete the reaction of the compound with the clay. When the reaction is completed, the excess water is removed and the organophilic clay is dried.

In preparing the organophilic clays, the clay slurry before reaction with the organophilic clay can be subjected to sufficient shear to separate clay agglomerates. Deagglomeration processes utilizing steam injection, extruders, pug-mills, homogenizers, colloid mills and the like have been disclosed in such patent as U.S. Pat.

Nos.: 3,951,850; 4,569,923; 4,664,820; 4,664,842 and 4,743,305 which are hereby incorporated by reference.

The preactivated organophilic clay of this invention is made by dry blending the organophilic clay and the propylene carbonate/silica blend in the amounts of about 75 to about 99 weight percent organophilic clay and about 1 to about 25 weight percent propylene carbonate/silica blend wherein said weight percents are based on the total weight of the two components.

The compositions of this invention can be used as rheological additives in a wide variety of non-aqueous liquid systems. They are useful in inks, paints, varnishes, enamels, waxes, adhesives, laminating resins, gel coats and the like. The organo-clays can be incorporated into the non-aqueous liquids using colloid mills, roller mills, ball mills, sand mills, media mills, and high speed dispersers.

The following examples describe the invention in more detail. Parts and percentages are by weight unless designated otherwise.

EXAMPLE 1

To a double cone mixer were added 120 parts of a precipitated silica having a BET surface area of 450 m2/g and an average agglomerate size of 50 micrometers. To the addition tank attached to the disperser bar of the mixer were added 228 parts of propylene carbonate and 12 parts of water. Rotation of the mixer was begun followed by the addition of the propylene carbonate-water solution. The solution was added over a 10 minute period. Mixing was continued for 10 minutes. The resulting blend was a dry free-flowing powder.

EXAMPLE 2

To a ribbon blender were added 1850 parts of an organoclay which was made from a bentonite clay and 90 meq. based on 100 grams of clay of dimethyldihydrogenated tallow ammonium chloride and 150 parts of the propylene carbonate-precipitated silica blend of Example 1. The components were blended until a uniform mixture was obtained, about 15 minutes. The preactivated organoclay composition was then discharged from the reactor.

EXAMPLE 3

To 82.0 parts of an aliphatic hydrocarbon having a distillation range of 281°-315° C., 7.1 parts of toluene and 0.9 part of water in a tripour beaker were added 10.0 parts of the preactivated clay of Example 2. The beaker contents were mixed using a Cowles blade for 15 minutes at 1,700 rpm and 5 minutes at 3,000 rpm. After standing for 1 hour, the viscosity was measured using a Haake VT-24 viscometer with an SV-II spindle. The viscosity was 715,200 cps.

EXAMPLE 4

Organoclays made with 85, 90, 95, 100 meq of dimethyldihydrogenated tallow ammonium chloride were preactivated using the procedure described in Example 2 with the propylene carbonate-silica blend of Example 1 at levels of 3, 5 and 7 percent propylene carbonate based on the weight of preactivated clay. The activity and dispersibility of the preactivated organoclays were determined using the procedure described in Example 3. The Haake viscosity values in centipoises are shown in Table I.

TABLE I

| Organoclay Meq. | % Propylene Carbonate | | |
|---|---|---|---|
| | 3% | 5% | 7% |
| 85 | 14,400 | 124,800 | 336,000 |
| 90 | 350,400 | 484,800 | 715,200 |
| 95 | 393,600 | 480,000 | 417,600 |
| 100 | 494,400 | 336,000 | 288,000 |

EXAMPLE 5

The activity and dispersibility of organoclays made from bentonite and 81 and 90 meq. of dimethyldihydrogenated tallow ammonium chloride preactivated with the propylene carbonate-silica blend of Example 1 were determined using the procedure of Example 4. The viscosity values, in centipoises, are shown in Table 2.

TABLE 2

| Organoclay Meq. | % Propylene Carbonate | | | |
|---|---|---|---|---|
| | 0% | 3% | 5% | 7% |
| 81 | F.O* | 172,800 | 355,200 | 456,000 |
| 90 | 72,000 | 360,000 | 537,600 | 633,600 |
| 90 | 96,000 | 432,000 | 710,400 | 417,600 |

*F.O = Fall out, i.e., no stable dispersion.

EXAMPLE 6

Organoclay made from bentonite and 90 meq of dimethyl dihydrogenated tallow ammonium chloride was preactivated with propylene carbonate/water/silica blends made as described in Example 1. Preactivator 1 contained 65 parts of a 95/5 solution of propylene carbonate and water and 35 parts of silica. Preactivator 2 contained 63 parts of a 95/5 solution of propylene carbonate and water and 37 parts of silica.

These preactivated clays were tested using the procedure described in Example 3. The viscosity values in centipoises are shown in Table 3 along with the viscosity values of dispersions made from unpreactivated organoclay and hydrocarbon liquid to which was added a 95/5 propylene carbonate/water solution prior to the addition of the clay.

TABLE 3

| % Activator | Preactivator 1 | Preactivator 2 | Conventional Activation |
|---|---|---|---|
| 3 | 388,800 | 326,400 | 355,200 |
| 4 | 465,600 | 393,600 | 504,000 |
| 5 | 398,400 | 460,800 | 417,600 |
| 6 | 489,600 | 499,200 | 451,200 |
| 7 | 393,600 | 518,400 | 417,600 |

As can be seen, the preactivation is comparable to conventional activation.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A free flowing dry powder comprising a blend of
   a) about 10 to about 75 weight percent 1,2-propylene carbonate; and b) about 25 to about 90 weight percent finely divided amorphous silica, wherein said weight percents are based on the total weight of a) and b) and wherein about 2 to about 10 weight percent of the propylene carbonate is replaced with an equal weight of water.

2. The free-flowing dry power of claim 1 wherein about 2 to about 6 weight percent of the propylene carbonate is replaced with an equal weight of water.

3. The free-flowing dry powder of claim 1 wherein a) is present in the amount of about 25 to about 70 weight percent and b) is present in the amount of about 30 to about 75 weight percent.

4. The free-flowing dry powder of claim 2 wherein a) is present in the amount of about 25 to about 70 weight percent and b) is present in the amount of about 30 to about 75 weight percent.

5. A preactivated organophilic clay composition comprising a dry blend of a) about 75 to about 99 weight percent of an organophilic clay wherein said clay is the reaction product of a smectite type clay having an ion exchange capacity of at least about 75 milliequivalents per 100 grams of clay and a quaternary ammonium compound having at least one alkyl substituent containing at least 10 carbon atoms; and b) about 1 to about 25 weight percent of a free-flowing dry powder made from a blend of i) about 10 to about 75 weight percent 1,2-propylene carbonate; and ii) about 25 to about 90 weight percent finely divided amorphous silica, wherein said weight percents are based on the total weight of c) and d) and wherein about 2 to about 10 weight percent of the propylene carbonate is replaced with an equal weight of water.

6. The composition of claim 5 wherein about 2 to about 6 weight percent of the propylene carbonate is replaced with an equal weight of water.

7. The composition of claim 5 wherein the organophilic clay is the reaction product of a) a smectite type clay having a cation exchange capacity of at least about 75 millequivalents (meqs) per 100 grams of clay on 100 percent active basis;

b) a quaternary ammonium compound having the structure

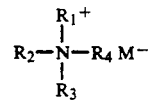

wherein $R_1$ is an alkyl group having about 10 to about 22 carbon atoms, wherein $R_2$, $R_3$ and $R_4$ are alkyl groups containing 1 to about 22 carbon atoms, aryl groups and arylaklyl groups containing 7 to about 22 carbon atoms and wherein M is chloride, bromide, iodide, nitrite, nitrate, sulfate, hydroxide or $C_1$ to $C_{18}$ carboxylate.

8. The composition of claim 7 wherein the organophilic clay contains about 50 to about 150 meqs of quaternary ammonium compound based on 100 grams of clay.

9. The composition of claim 8 wherein the meqs are about 80 to about 130.

* * * * *